United States Patent [19]

Myers

[11] Patent Number: 4,875,920

[45] Date of Patent: Oct. 24, 1989

[54] ION-EXCHANGEABLE PHOSPHATE GLASS COMPOSITIONS AND STRENGTHENED OPTICAL QUALITY GLASS ARTICLES

[75] Inventor: John D. Myers, Hilton Head Island, S.C.

[73] Assignee: Kigre, Inc, Hilton Head Island, S.C.

[21] Appl. No.: 128,676

[22] Filed: Dec. 4, 1987

[51] Int. Cl.$^4$ .............................................. C03C 21/00
[52] U.S. Cl. .................. 65/30.14; 65/30.13; 65/116; 501/45
[58] Field of Search ..................... 65/30.13, 30.14, 116; 501/45

[56] References Cited

U.S. PATENT DOCUMENTS

| | | | |
|---|---|---|---|
| 2,779,136 | 1/1957 | Hood | 65/30.14 |
| 3,218,220 | 11/1965 | Weber | 65/30.14 |
| 3,357,876 | 12/1967 | Rinehart | 65/30.14 |
| 3,687,779 | 8/1972 | Spanoudis | 156/401 |
| 3,765,855 | 10/1973 | Larrick | 65/30.14 |
| 3,938,974 | 2/1976 | Macedo et al. | 65/30.13 |
| 4,074,992 | 2/1978 | Voss | 65/30.14 |
| 4,074,993 | 2/1978 | Ackerman et al. | 65/30.14 |
| 4,075,120 | 2/1978 | Myers et al. | 501/48 |
| 4,239,645 | 12/1980 | Izumitani et al. | 501/45 |
| 4,248,732 | 2/1981 | Myers et al. | 501/45 |
| 4,333,848 | 6/1982 | Myers | 501/45 |
| 4,472,030 | 9/1984 | Tachibana et al. | 65/30.14 |

OTHER PUBLICATIONS

"Flexural Testing of Glass(Determination of Modulus of Rupture)", 1987 *Annual Book of ASTM Standards,* vol. 15.02, pp. 25–36.
"Strengthening by Ion-Exchange ", *Journal of The American Ceramic Society,* vol. 47, No. 5, pp. 215–219.
"Stresses in Glass Produced by Nonuniform Exchange of Monovalent Ions", *Journal of The American Ceramic Society*-Rigby and Hutton, vol. 45, No. 2, pp. 59–68.

*Primary Examiner*—William R. Dixon, Jr.
*Assistant Examiner*—Anthony J. Green
*Attorney, Agent, or Firm*—Dykema Gossett

[57] ABSTRACT

Ion-exchangeable phosphate glass compositions containing in mole percent from about 50 to 70% $P_2O_5$, from about 5 to 30 % $Li_2O$, from about 5 to 25% MO, where M is selected from the group consisting of Be, Mg, Ca, Sr, Ba, and Zn, and about 5 to 30% $X_2O_3$, where X is selected from the group consisting of Al, Y, La, Ce, Pr, Nd, Pm, Sm, Eu, Gd, Tb, Dy, Ho, Er, Tm, Yb and Lu are provided. In another aspect, the phosphate glass compositions of the present invention also contain in mole percent up to 10% $R_2O$, where R is selected from the group consisting of Na, K, Rb and Cs. Solarization inhibitors and minor amounts of anhydrous fluorides and chlorides are also included in some embodiments. Optical quality phosphate glass articles formed of the phosphate glass compositions of the present invention are readily ion- exchangeable when contacted with certain salts. Optical quality phosphate glass articles are also provided having good thermal shock resistance. These glass articles have an inner tension region and an outer compressive surface layer formed using an ion exchange process. In some embodiments, laser rods and similar active optical elements are formed from the strengthened phosphate glass articles of the present invention where the optical elements are doped with an amount of a suitable dopant effective for laser activity.

13 Claims, 1 Drawing Sheet

ION-EXCHANGEABLE PHOSPHATE GLASS COMPOSITIONS AND STRENGTHENED OPTICAL QUALITY GLASS ARTICLES

FIELD OF THE INVENTION

The present invention relates generally to phosphate glasses and more specifically deals with phosphate glass compositions which have high thermal shock resistance. The present invention also relates to optical quality phosphate glass articles such as laser rods and the like and to laser devices which incorporate these glass articles.

BACKGROUND OF THE INVENTION

It is well-known that laser glasses must be able to withstand high internal temperatures created by flash lamps and the like without experiencing significant distortion, cracking or any significant change in optical properties. Commonly referred to as thermal shock resistance, optical elements such as laser rods, slabs, discs and fibers must be capable of enduring high-frequency optical pumping without catastrophic failure. In operation, a laser glass element acquires heat from the pumping light source. In order to dissipate this heat, laser devies are typically liquid-cooled which helps prevent thermal rupture of the laser glass element. However, laser glass rods and the like still develop large internal temperature gradients, causing thermally-induced stress across the element. At high powers and high repetition rates, conventional laser glasses may fracture as the result of large thermal gradients produced by internal optical pumping.

It is also known that thermal distortion of laser glass elements produces a variance in refractive index which may cause optical distortion of the laser beam. Hence, it is important to provide laser glasses which have a small change in refractive index over broad temperature ranges. In some instances it is even desirable to provide laser glass elements having a negative change in refractive index to partially compensate for optical distortions produced by a positive coefficient of thermal expansion. These thermal effects are also known to diminish the energy efficiency of active laser components. Therefore, it would be desirable to provide glass compositions which could be formed into optical components having good mechanical strength and high thermal shock resistance for use as laser elements, filters and the like.

A number of methods for strengthening silicate-based glasses have been proposed, including ion-exchange or "stuffing" of the surface of a silicate glass article with large ions in exchange for small ions below the softening temperature of the glass. For example, one such method is disclosed in "Stresses in Glass Produced By Non-Uniform of Monovalent Ions," J. Am. Ceram. Soc. 45 [2] 59–68 (1962) wherein a chemical method of silicate glass strengthening is disclosed which involves low-temperature ion exchange. Other investigators, notably Nordberg et al., "Strengthening By Ion Exchange," J. Am. Ceram. Soc. 47 [5] 215–219 (1964), have described low-temperature ion exchange strengthening of silicate glassess. Ion exchange treatment of lithia silicate laser glasses is also discussed in U.S. Pat. No. 3,687,799, entitled "Glass Lasers of Increased Heat Dissipation Capability Made By Ion Exchange Treatment of Laser Glass." However, very little research has been conducted on the strengthening of nonsilicate glasses.

In U.S. Pat. Nos. 4,075,120 and 4,248,732, both of which are assigned to the assignee of the present invention and which are incorporated herein by reference, novel phosphate glass compositions particularly suitable for forming laser glass elements are disclosed. As will be shown, the present invention provides phosphate glass compositions which are unique in their ability to be ion-exchanged. That is, the phosphate glass formulations of the present invention unexpected superior results over the prior art.

In U.S. patent application "Ion-Exchangeable Germanate Glass Compositions and Strengthened Germanate Glass Articles," filed Oct. 27, 1987, and assigned to the assignee of the present invention, novel germanate glass compositions and articles formed of these germanate glasses are disclosed which exhibit good mechanical strength. However, although phosphate glasses have unique properties which make them superior to silicate, borate and most other glasses for certain applications, to applicant's knowledge, no one has successfully ion-exchanged a phosphate glass composition to produce optical quality thermal shock resistant glass articles as provided by the present invention. Therefore, there exists a long-felt need for phosphate glass compositions from which thermal shock resistant articles can be made and for optical quality glass articles which exhibit good mechanical strength and which have a high degree of thermal shock resistance. The present invention provides ion-exchangeable phosphate glass compositions and optical quality strengthened phosphate glass articles which satisfy this need.

SUMMARY OF THE INVENTION

In accordance with the present invention, in one aspect there is provided phosphate glass compositions which develop unexpected favorable thermal and optical properties when ion exchanged in accordance with the present invention. More specifically, the phosphate glass compositions as provided herein produce unexpected superior results when ion-exchanged to form thermal shockresistant glass articles. Preferably, the phosphate glass compositions of the present invention contain a mixture of $P_2O_5$, $Li_2O$, MO (where M is selected from the group consisting of Be, Mg, Ca, Sr, Ba and Zn) and $X_2O_3$ (where X is selected from the group consisting of Al, Y, La, Ce, Pr, Nd, Pm, Sm, Eu, Gd, Tb, Dy, Ho, Er, Tm, Tb, and Lu). In this embodiment, the preferred compositional ranges in mole percentage are approximately 50 to 70% $P_2O_5$, approximately 5 to 30% $Li_2O$, approximately 5 to 25% MO, and approximately 5 to 25% $X_2O_3$. It is to be understood that mixtures of the various species designated generally by $X_2O_3$ are to be included in a single composition, as well as mixtures of the species designated generally MO. That is, an ion-exchangeable phosphate glass composition made in the accordance with the present invention may for example include both BeO and MgO or BeO and CaO, with the combined or total mole percentage being preferably maintained within the preferred range for MO.

In another embodiment, the ion-exchangeable phosphate compositions of the present invention also include, in addition to $Li_2O$ which is essential to the invention, $R_2O$, where R is selected from the group consisting of Na, K, Rb and Cs. The concentration in mole percent of $R_2O$ in the phosphate glass composition preferably ranges from about 0.0 to about 10%. Again, mixtures of the species designated by $R_2O$ such as $Na_2O$ and $K_2O$ are suitable.

In another aspect, the present invention provides phosphate glass articles exhibiting good thermal shock resistance and high mechanical strength which are particularly suitable for use in forming optical elements such as laser glass rods and filters. These thermal shock-resistant phosphate glass articles have a relatively uniform make-up except for the outer layer which, relative to the inner glass region, has a low concentration of lithium ions and a high concentration of a preselected ion. That is, the articles have a compositional gradient such that the surface layer has a lower concentration of lithium than the inner regions and has a higher concentration of a selected ion, other than lithium, than the inner region. This will become more apparent during the explanation of the preparation of the thermal shock-resistant phosphate glass articles of the present invention. The glass articles may be formed in a variety of shapes and thicknesses and are particularly suitable for use as optical elements such as laser rods and filters.

Hence, in still another embodiment, the present invention provides optical elements which are formed from the thermal shock-resistant phosphate glass articles of the present invention. The chemically-strengthened phosphate glass articles may be doped with an amount of a suitable dopant effect for laser activity for the fabrication of laser rods or the like. Optical discs or plates may also be formed. By providing thermal shock-resistant laser glass elements, glass fracture or rupture caused by large thermal gradients produced during internal optical pumping is substantially reduced. Thus, by providing thermal shock-resistant laser glasses, the present invention allows laser rods and the like to be fabricated which can be used at much higher powers than conventional phosphate glass laser elements. The thermal shock-resistant phosphate glass articles of the present invention are also favorably characterized by a small and sometimes a negative change in refractive index as the temperature of the glass article increases. Thus, in addition to reducing glass fracture, the glass articles of the present invention reduces distortion of the laser beam when the laser glass elements are subjected to high pumping powers.

In still another aspect, the present invention provides a method for forming the thermal shock-resistant glass articles of the present invention. The method begins in a preferred embodiment with the preparation of a phosphate glass article from the preferred phosphate glass compositions described herein. The phosphate glass article is then contacted with a salt, preferably a molten alkali metal salt bath, at a temperature below the annealing temperature of the phosphate glass article to ion-exchange the surface layer. In this manner, an outer compression layer is formed by exchanging smaller ions present in the surface layer with larger ions from the salt bath. This "stuffing" of the surface layer with large ions creates a compressive stress or outer compression layer in the phosphate glass article. Ion exchange is conducted under conditions which do not allow the compression layer to relax during cooling of the strengthened phosphate glass article. Hence, the cooled glass article has a surface layer in compression and a core in tension, producing high mechanical strength and good thermal shock resistance.

DESCRIPTION OF THE PREFERRED EMBODIMENTS

Figure 1:
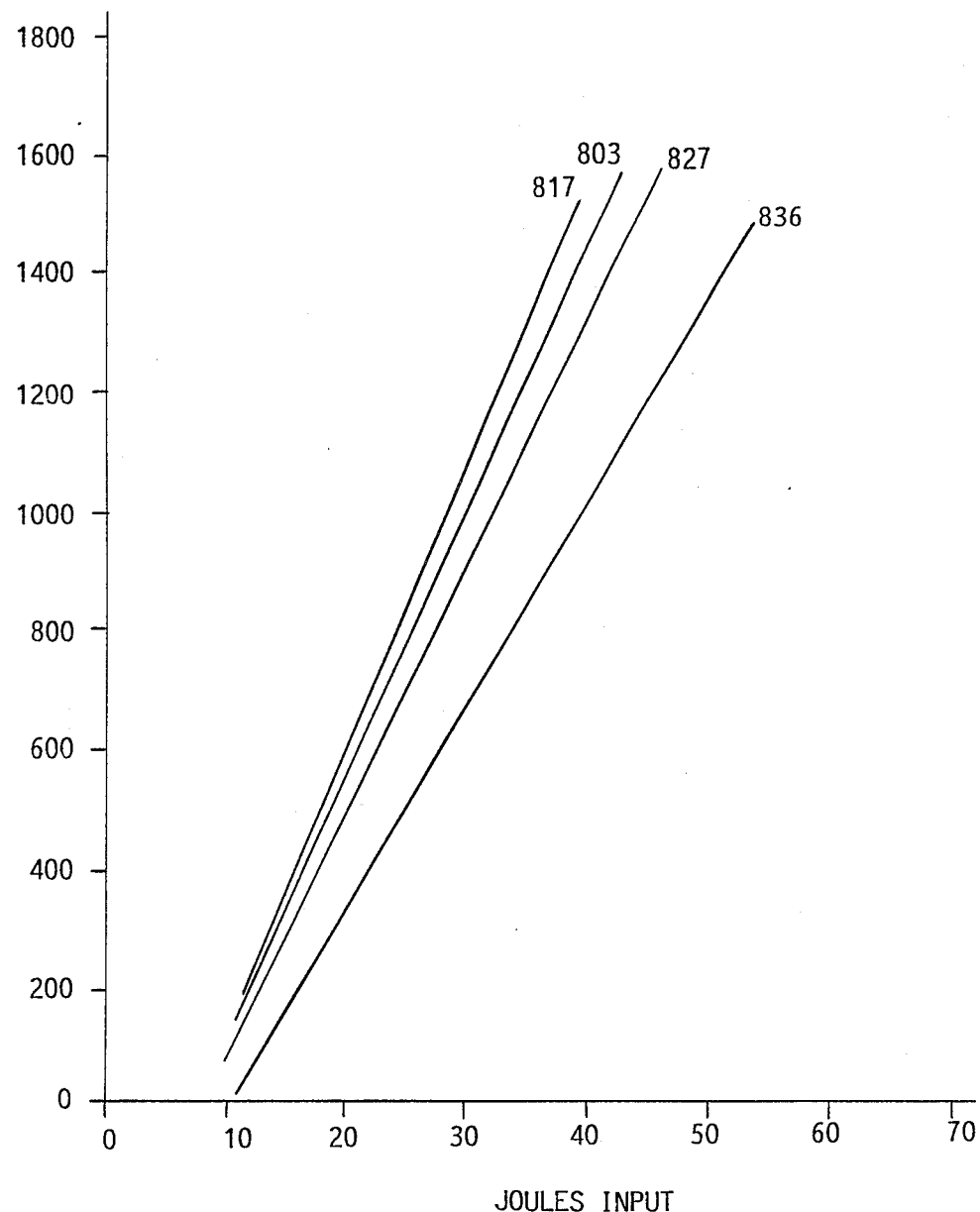
FIG. 1 is a graph illustrating the lasing slope efficiencies of illustrative laser glass rods made in accordance with the present invention.

In one embodiment, the phosphate glass compositions of the present invention contain $P_2O_5$, $Li_2O$, one or more of the following compounds, BeO, MgO, CaO, SrO, BaO, ZnO, and one or more of the compounds, $Al_2O_3$, $Y_2O_3$, $La_2O_3$, $Ce_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$ $Er_2O_3$, $Tm_2O_3$, $Yb_2O_3$ and $Lu_2O_3$. For simplicity, the preferred glass compositions may be expressed as containing $P_2O_5$, $Li_2O$, MO, where M is selected from the group consisting of Be, Mg, Ca, Sr, Ba, and Zn, and combinations therefore, and further containing $X_2O_3$, where X is selected from the group consisting of Al, Y, La, Ce, Pr, Nd, Pm, Sm, Eu, Gd, Tb, Dy, HO, Er, Tm, Yb, Lu and combinations thereof. In the most preferred compositions the MO constituent is predominantly BaO.

In another aspect, in addition to the above-stated constituents, the phosphate glass compositions of the present invention include one or more of the compounds, $Na_2O$, $K_2O$, $Rb_2O$ and $Cs_2O$. Again, for simplicity, in this embodiment, the present invention may be expressed as containing $P_2O_5$, $Li_2O$, MO, where M is one of the aforementioned M constituents, $X_2O_3$, where X is one of the aforementioned X constituents and $R_2O$, where R is selected from the group consisting of Na, K, Rb, Cs and combinations thereof.

The addition of $X_2O_3$ significantly increases the chemical durability of articles formed of the preferred phosphate glass compositions of the present invention, a factor which is important in decreasing the attack or corrosion of the glass articles during subsequent chemical strengthening in a molten salt bath. Also, in some applications, it is preferred that $R_2O$ comprise predominantly $K_2O$ or another heavy alkali oxide. The heavier alkali oxides help reduce change in refractive index with temperature (dn/dT) of phosphate glass articles formed of the inventive compositions. It should be noted, however, that corrosion of the glass articles increases as the concentration of $R_2O$ increases and thus its concentration should be limited accordingly. The purity of the composition which is required will be dictated by the application of the finished article, as will be appreciated by those skilled in the art.

Preferred phosphate glass compositions of the present invention which demonstrate unexpected superior ion exchange properties contain approximately 50 to 70 mole percent $P_2O_5$, approximately 5 to 30 mole percent $Li_2O$, approximately 5 to 25 mole percent MO, approximately 5 to 25 mole percent $X_2O_3$, and, where $R_2O$ is included, approximately 0.0 to 10 mole percent $R_2O$. Preferred are those phosphate glass compositions of the present invention which have from approximately 55 to 65 mole percent $P_2O_5$, approximately 10 to 20 mole percent $Li_2O$, approximately 10 to 15 mole percent MO, approximately 10 to 18, and more preferably, 16 to 18 mole percent $X_2O_3$, and, in those embodiments which also include $R_2O$, approximately 0.0 to 5 mole percent $R_2O$. The broad and preferred concentration ranges are set forth respectively in Tables I and II as follows:

TABLE I

| Compound | Approximate mole percent based on total glass composition as oxide content before ion exchange |
| --- | --- |
| $P_2O_5$ | 50–70 |
| $Li_2O$ | 5–30 |
| $R_2O$ | 0–10 |
| MO | 5–25 |
| $X_2O_3$ | 5–25 |

TABLE II

| Compound | Approximate mole percent based on total glass composition as oxide content before ion exchange |
| --- | --- |
| $P_2O_5$ | 55–65 |
| $Li_2O$ | 10–20 |
| $R_2O$ | 0–5 |
| MO | 10–15 |
| $X_2O_3$ | 10–18 |

In another aspect, the phosphate glass compositions of the present invention include one or more solarization inhibitors. It will be appreciated by those skilled in the art that solarization darkens the glass, reducing its efficiency. Preferred inhibitors include $Nb_2O_5$, $Sb_2O_3$, $TiO_2$, $CeO_2$, and $MoO_3$. Other suitable solarization inhibitors will be known to those skilled in the art. Also, the phosphate glass compositions of the present invention may include from about 0.01 mole percent to about 5.0 mole percent of solid anhydrous chloride and/or solid anhydrous fluoride to aid in water removal. Preferred fluorides are selected from the group of consisting of aluminum fluoride, lithium fluoride, sodium fluoride, potassium fluoride and combinations thereof. Preferred chlorides are selected from the group consisting of aluminum chloride, lithium chloride, sodium chloride, potassium chloride and combinations thereof. Melting the phosphate glass compositions under a dry atmosphere or bubbling a dry gas through the glass melt will also aid in water removal from the glass. Conventional glass preparation techniques can be used to form molten glass having the preferred compositions, which is then cast into the desired shapes. The laser glasses of this invention may be prepared in accordance with recognized present-day melt procedures. Preferably, the melting is accomplished in refractory crucibles, such as fused quartz, zirconia and alumina, or in precious metal crucibles, such as platinum and platinum alloys. Melting of the glasses of this invention is accomplished at temperatures of from about 1500° F. to about 2300° F. Standard stirring and casting techniques are employed to obtain the desired forms, including rods, disks, plates, fibers and other configurations associated wtih laser solid state technology. Less common glass-forming techniques which will be understood by those skilled in the art, such as the "sol-gel" process for forming glass would also be suitable. The shaped phosphate glass article is then preferably ion-exchanged as will be described more fully hereinafter.

As stated, the phosphate glass articles formed from the phosphate glass compositions of the present invention are unique in their ability to be ion-exchanged, which increases their mechanical strength and increases their thermal shock resistance. The inventive ion-exchanged phosphate glass articles of the present invention have an outer surface layer or region which is modified with respect to the inner core such that the outer surface layer has a lower concentration of lithium ions than the inner region. Also, the outer surface layer has a higher concentration of a selected ion or ions than the concentration of the selected ion in the inner region. That is, the compressive stress surface layer has essentially the same composition as the remainder of the glass except that the concentration of lithium ions is less than the remainder of the glass and the concentration of ions of a different selected ion is greater in the surface layer than in the remainder of the glass. The presence of these larger ions provides a compressive stress in the surface layer relative to the inner tension region. This provides a substantially strengthened phosphate glass article having high thermal shock resistance.

In a preferred embodiment, the outer surface layer contains a high concentration of sodium ions with respect to the core or inner region of the glass article. In another embodiment the outer surface layer contains a higher concentration of potassium or potassium and sodium ions than the inner region. Most preferred are sodium ions which exchange well with lithium ions present in the ion-exchangeable glass compositions of the present invention. Other alkali metal ions may be suitable, such as rubidium or cesium, alone or in combination with the other preferred alkali metal ions, the concentrations of which are again highest in the surface layer. Of course, lithium ions are not suitable as the selected ion since lithium ions are the smallest replaceable ions in the preferred glass compositions.

It will be appreciated by those skilled in the art that the concentration of ions which are substituted into the surface layer of the phosphate glass article of the present invention as well as the depth of the ion-exchanged surface layer is determined by diffusion laws and is thus in part a function of the length of exposure of the glass article to the source of ions to be diffused into the surface. Diffusion is also a function of the temperature at which the ion-exchange process is carried out. The monovalent ions which are removed from the surface layer of the phosphate glass article during ion exchange are predominantly lithium ions. In the method of the present invention, the thermal shock-resistant phosphate articles of the present invention are formed by starting with a batch of glass having one of the preferred compositions which is then cast in the conventional manner to form phosphate glass articles.

The phosphate glass articles so produced are ion-exchanged by contacting the surfaces of the glass articles preferably with a molten salt bath. It may be possible to diffuse the preferred ionic species into the glass article surface using a suitable solvent, such as an organic solvent or the like or by using other diffusion or ion implant techniques. The salt bath is preferably a molten alkali metal salt bath other than a lithium salt bath and, as stated, preferred alkali metal salts for use in the present invention are salts of sodium, potassium, rubidium, and cesium. The addition of some lithium to the alkali metal salt bath, however, may be appropriate to control the rate of ion exchange or to lower the melting point of the alkali metal salt. The most preferred salt baths are sodium salts, preferably sodium nitrate ($NaNO_3$).

In a preferred embodiment, the formed phosphate glass articles are ion-exchanged by immersing them in a bath of the molten alkali metal salt. Alkali ions in the salt bath diffuse into the surfaces of the phosphate glass articles where they are "exchanged" for smaller ions present in the glass surface. That is, the ionic radii of alkali metal ions may be ranked in the following manner: lithium < sodium < potassium < rubidium < cesium. Thus, where the molten alkali salt bath contains sodium ions, sodium ions replace lithium ions in the glass structure. This substitution at the surface of larger ions for smaller ions sets up a significant stress or compressive layer at the surface of the glass article. This high compressive stress outer layer overlies an inner tension region or core of the glass articles since no substantial exchange of ions occurs in the inner glass region. This producues a significantly strengthened phosphate glass article having hig thermal shock resistance as demonstrated in the test data set forth herein. In those compositions of the present invention where both lithium and sodium oxides are included, and wherein the salt bath contains sodium ions, the sodium ions will replace both lithium and sodium ions in the glass. While the sodium-for-sodium exchange will not increase compression, the sodium- for-lithium exchange will strengthen the glass. It is theorized that depending upon the relative amounts of sodium, potassium and lithium in a particular glass article, the glass article could still be strengthened in a sodium bath because of a preferential exchange of sodium for lithium. In lieu of sodium and potassium, it may be possible to diffuse other ionic species into the surface layer such as silver ions. A preferred bath contains from about 0 to 50% by weight $NaNO_3$ and from about 50 to 100% by weight $KNO_3$. Drying agents such as 1 to 10% aluminum powder may be employed to help extend the usable lifetime of the bath.

One significant advantage of the present invention is that it provides phosphate glass articles which can be ion-exchanged at temperatures sufficiently below their annealing temperature so that distortion of the glass article which might otherwise occur during ion exchange is minimized. Thus, in one embodiment, phosphate glass articles formed from the preferred phosphate glass compositions provided by the present invention are polished or finished to form optical elements and are then ion-exchanged below their annealing point in the described manner. In this fashion, strengthened optical elements such as laser rods, slabs, and discs can be formed which are used to transmit or reflect light and which have high thermal shock resistance. That is, these compositions allow chemical strengthening of active optical elements while minimizing distortion, an important factor in optical glasses. Doping with an effective amount of a dopant to provide good lasing properties is carried out using conventional doping techniques. One preferred dopant is provided by $Nd_2O_3$ to form neodymium doped glass lasers in accordance with the present invention. Other suitable dopants will be known to those skilled in the art. Methods of doping the inventive glass articles with suitable dopant ions will be known to those skilled in the art. From about 0.03 to about 3.0 mole percent $Nd_2O_3$ is preferred.

As stated, the temperature of the molten salt bath in which ion exchange is conducted should be controlled such that the temperature of the phosphate glass articles is maintained below its annealing temperature during ion exchange. That is, the surface layer of the phosphate glass article which is transformed into a compressive layer should always be below the annealing temperature of the glass article to prevent relaxation of the outer compressive stress layer. Also, the salt balt should preferably be maintained at a temperature which is high enough to facilitate fairly rapid diffusion of the selected ions into the glass article. The preferred temperature of the molten salt bath is approximately 280 to approximately 410 degrees C., more preferably approximately 300 to approximately 380 degrees C., and most preferably about 320 degrees C. Temperatures outside these ranges may be suitable in a particular application. Also, where the phosphate glass article is ground and polished, such as where an optical element will be formed, it is preferable that the polishing or finishing take place before the glass article is contacted with molten alkali metal salt bath. Conventional finishing and polishing techniques will be known to those skilled in the art.

Again, the depth and thickness of the compressive layer are determined in part of the length of time which the phosphate glass article is exposed to the salt bath. Where the molten alkali metal salt bath is maintained at a temperature which is within the preferred range as described herein, it is preferred that the phosphate glass article be contacted with the salt bath for a period of approximately 1 to approximately 500 hours, more preferably approximately 8 to 244 hours, and most preferably from approximately 16 hours to approximately 144 hours. With these conditions, a compressive layer of approximately 10 to approximately 400 microns and preferably from about 120 microns to about 300 microns thick may be formed. A compressive surface layer of these dimensions provides excellent mechanical strength and good thermal shock resistance. It may also be desirable to subject the phosphate glass article to an acid wash such as sulfuric acid prior to the step of contacting the surface with the salt bath to remove surface irregularities which are known to affect strength. Also, an acid wash following formation of the compressive layer may be desirable to remove a very thin tension which sometimes forms overlying the compressive layer.

While particular embodiments of this invention have been shown and described herein, it will be understood, of course, that the invention is not to be limited thereto, since many modifications may be made, particularly by those skilled in the art in light of this disclosure. It is contemplated therefore by the appended claims to cover any such modifications as fall within the true spirit and scope of this invention.

The following examples are set forth to further illustrate and describe the present invention are intended in any way to limit its scope.

EXAMPLES

Multiple phosphate glass compositions prepared in accordance with the present invention and having the preferred compositions as described herein were prepared by batch melting using conventional heating, refining, stirring and casting techniques to form phosphate glass articles. The samples were given reference numerals 1 through 21. The constituents in mole percent are set forth in the following Tables I-III.

TABLE I

| | Mole % | | | | | | |
|---|---|---|---|---|---|---|---|
| | #1 P803 | #2 P781 | #3 P786 | #4 P787 | #5 P788 | #6 P789 | #7 P790 |
| $P_2O_5$ | 60 | 60 | 60 | 60 | 60 | 60 | 60 |
| $Li_2O$ | 17 | 17 | 15 | 16 | 17 | 17 | 17 |
| $K_2O$ | — | — | 2 | 1 | — | — | — |
| BaO | 11.5 | 11.5 | 11.5 | 11.5 | 11.5 | 11.5 | 11.5 |
| $Al_2O_3$ | 6.5 | 11.5 | 11.5 | 11.5 | 6.5 | 6.5 | 4.0 |
| $Y_2O_3$ | 5.0 | —. | — | — | — | 5.0 | 5.0 |
| $La_2O_3$ | — | — | — | — | 5.0 | — | 2.5 |
| $Nd_2O_3$ | 2.39 | (2.31)* | (2.33)* | (2.32)* | (2.52)* | (2.42)* | (2.53)* |
| $Nb_2O_5$ | — | (.48)* | (0.49)* | (0.48)* | (0.54)* | (0.52)* | (0.54)* |

TABLE I-continued

| | #1 P803 | #2 P781 | #3 P786 | #4 P787 | #5 P788 | #6 P789 | #7 P790 |
|---|---|---|---|---|---|---|---|
| | | Mole % | | | | | |
| $Sb_2O_3$ | — | (0.20)* | (0.23)* | (0.23)* | (0.24)* | (0.24)* | (0.25)* |

TABLE II

| | #8 P791 | #9 P793 | #10 P794 | #11 P795 | #12 P796 | #13 P809 | #14 P817 |
|---|---|---|---|---|---|---|---|
| | | | Mole % | | | | |
| $P_2O_5$ | 60 | 60 | 60 | 62 | 64 | 60 | 60 |
| $Li_2O$ | 15 | 19 | 19 | 17 | 15 | 7.5 | 16 |
| $Na_2O$ | — | — | — | — | — | 75 | — |
| $K_2O$ | — | — | — | — | — | — | 1 |
| BaO | 13.5 | 11.5 | 11.5 | 11.5 | 11.5 | 13.5 | 11.5 |
| $Al_2O_3$ | 6.5 | 9.5 | 4.75 | 4.75 | 4.75 | 11.5 | 6.5 |
| $Y_2O_3$ | 5.0 | — | 4.75 | 4.75 | 4.75 | — | 5.0 |
| $La_2O_3$ | — | — | — | — | — | — | — |
| $Nd_2O_3$ | (2.48)* | (2.28)* | (2.39)* | (2.44)* | (2.48)* | 1.16 | 2.40 |
| $Nb_2O_5$ | (0.53)* | (0.48)* | (0.51)* | (0.52)* | (0.53)* | 0.49 | — |
| $Sb_2O_3$ | (0.24)* | (0.22)* | (0.23)* | (0.24)* | (0.24)* | 0.22 | — |

TABLE III

| | #15 P827 | #16 P836 | #17 P837 | #18 P847 | #19 P805 | #20 P811 | #21 P842 |
|---|---|---|---|---|---|---|---|
| | | | Mole % | | | | |
| $P_2O_5$ | 60 | 60 | 60 | 60 | 60 | 60 | 59.12 |
| $Li_2O$ | 15 | 17 | 16.5 | 16.5 | — | — | 9.64 |
| $Na_2O$ | — | — | — | — | — | — | 4.9 |
| $K_2O$ | 2 | 0.5 | 0.5 | 0.5 | 15 | 17 | — |
| BaO | 11.5 | 11.5 | 13.5 | 13.5 | 13.5 | 11.5 | 13.73 |
| $Al_2O_3$ | 6.5 | 6.0 | 6.0 | 6.0 | 11.5 | 6.5 | 9.07 |
| $Y_2O_3$ | 5.0 | 5.0 | 3.5 | 3.5 | — | 5.0 | — |
| $La_2O_3$ | — | — | — | — | — | — | — |
| $Nd_2O_3$ | 2.42 | 2.39 | 2.38 | 3.02 | 1.23 | 1.28 | — |
| $Nb_2O_5$ | — | — | — | — | 0.52 | 0.54 | 0.6 |
| $Sb_2O_3$ | — | — | — | — | 0.23 | 0.25 | 0.56 |
| $SiO_2$ | | | | | | | 1.23 |
| $Sm_2O_3$ | | | | | | | 1.96 |

For each sample 1–21, an identifying P number was assigned. The index of refraction (Nd) was measured for each glass sample, and the values are set forth in Table IV.

TABLE IV

| | #1 P803 | #2 P781 | #3 P786 | #4 P787 | #5 P788 | #6 P789 | #7 P790 |
|---|---|---|---|---|---|---|---|
| Nd (measured) | 1.559 | 1.554 | 1.548 | 1.548 | 1.560 | 1.555 | 1.560 |

| | #8 P791 | #9 P793 | #10 P794 | #11 P795 | #12 P796 | #13 P809 | #14 P817 |
|---|---|---|---|---|---|---|---|
| Nd (measured) | 1.559 | 1.546 | 1.550 | 1.549 | 1.548 | 1.548 | 1.559 |

| | #15 P827 | #16 P836 | #17 P837 | #18 P847 | #19 P805 | #20 P811 | #21 P842 |
|---|---|---|---|---|---|---|---|
| Nd (measured) | 1.558 | — | — | — | 1.535 | 1.539 | — |

In addition, properties of the glass samples were calculated based on the compositional characteristics of each sample. These calculated properties include the index of refraction (Nd) for each sample, which was compared to the measured values. The coefficient of thermal expansion ($\alpha$), $W_o$, representing the thermal coefficient for the optical path length and the change in the refractive index with temperature (dn/dT) were calculated. Finally, the non-linear index ($N_2$) was calculated. The calculated values determined for those properties for each test sample are listed in the following Table V.

TABLE V

| Calculated Properties | | | | | | | |
|---|---|---|---|---|---|---|---|
| | #1 P803 | #2 P781 | #3 P786 | #4 P787 | #5 P788 | #6 P789 | #7 P790 |
| Nd | 1.547 | 1.546 | 1.546 | 1.545 | 1.562 | 1.552 | 1.560 |
| $\alpha$ ($\times 10^{-7}$/°C.) | 88 | 89 | 92 | 91 | 87 | 86 | 85 |
| w ($\times 10^{-7}$/°C.) | 46 | 48 | 44 | 46 | 49 | 49 | 49 |
| dn/dT($\times 10^{-7}$/°C.) | −2 | 0 | −6 | −3 | 0 | 1 | 1 |
| $N_2$ ($10^{-13}$ eus) | 1.25 | 1.24 | 1.24 | 1.24 | 1.40 | 1.35 | 1.44 |
| | #8 P791 | #9 P793 | #10 P794 | #11 P795 | #12 P796 | #13 P809 | #14 P817 |
| Nd | 1.555 | 1.544 | 1.550 | 1.549 | 1.549 | 1.541 | 1.546 |
| $\alpha$ ($\times 10^{-7}$/°C.) | 86 | 94 | 91 | 90 | 89 | 100 | 89 |
| w ($\times 10^{-7}$/°C.) | 47 | 44 | 44 | 44 | 44 | 37 | 44 |
| dn/dT($\times 10^{-7}$/°C.) | 0 | −7 | −6 | −5 | −5 | 18 | −5 |
| $N_2$ ($10^{-13}$ esu) | 1.37 | 1.24 | 1.34 | 1.34 | 1.33 | 1.23 | 1.25 |
| | #15 P827 | #16 P836 | #17 P837 | #18 P847 | #19 P805 | #20 P811 | #21 P842 |
| Nd | 1.546 | 1.546 | 1.546 | 1.548 | 1.536 | 1.538 | |
| $\alpha$ ($\times 10^{-7}$/°C.) | 91 | 90 | 94 | 93 | 117 | 118 | |
| w ($\times 10^{-7}$/°C.) | 42 | 44 | 39 | 40 | 13 | 10 | |
| dn/dT($\times 10^{-7}$/°C.) | −8 | −5 | −12 | −10 | −50 | −53 | |
| $N_2$ ($10^{-13}$ esu) | 1.24 | 1.25 | 1.23 | 1.25 | 1.18 | 1.27 | |

EXAMPLE 1

A sample of glass P803 was treated in a molten salt bath consisting of 30% by weight $NaNO_3$ at 610 degrees F for 18 hours. After this treatment, the glass was examined and was found to have developed a significant stress layer at the surface. This layer was estimated to be approximately 100 micrometers thick.

EXAMPLE 2

A sample of glass P803 was treated in a molten salt bath consisting of 22% by weight $NaNO_3$ plus 78% by weight $KNO_3$ at 610 degrees F. for 18 hours. After this treatment, the glass was found to have a significant stress layer at the surface. This layer was estimated to be approximately 150 micrometers thick.

EXAMPLE 3

A series of P803 glass samples were heated for 0, 19, 42 and 64 hours respectively at 610 degrees F in a 22% by weight $NaNO_3$ plus 78% by weight $KNO_3$ bath. A significant stress layer was observed at the surface of all of the samples treated in the salt bath. These samples were then heated to various temperatures and quenched in cold water. The temperatures at which the samples fractured were recorded. It was found that the thermal shock resistance of the samples increased significantly as the ion-exchanged time increased as follows:

| Heat Treatment Time in Salt Bath | Thickness of Observed Stress Layer | Temperatures at Which Samples Fractured Upon Quenching Into Water |
|---|---|---|
| 0 hrs | — | 78° C. |
| 19 hrs | 180 micrometers | 153° C. |
| 42 hrs | 280 micrometers | 227° C. |
| 64 hrs | 350 micrometers | 259° C. |

EXAMPLE 4

Laser rods 0.25 inches in diameter by 3.25 inches in length were prepared from the glass P803. These rods were finished to optical quality in the customary manner. The laser rods were then ion-exchanged in a molten salt bath consisting of 22% by weight $NaO_3$ plus 78% by weight KNO₃ at 610 degrees F. for 144 hours. The rods were then tested in the laser cavity with the feedback mirrors separated from the laser rods. The thermal distortion of the laser rods was estimated by measuring the divergence of the laser beam as a function of time when the laser was rapidly pulsed. The beam diverence of the laser beam using this glass was found to be quite good. This is because of the very low value (near zero) of dn/dT for this glass. Some increase in the beam diverence was observed during pumping since the value of dn/dT was not sufficiently negative to compensate completely for the high positive coefficient of thermal expansion of the glass.

EXAMPLE 5

The overall efficiency for converting stored electrical energy into laser light at 1060 nanometers for the laser rods tested in the preceding example (Example 4) was measured as a function of the pump energy. The results of this test of these samples, as well as for several other glasses, are plotted in FIG. 1 of the drawings.

The overall efficiency at a pump energy of 40.5J was approximately 1.7%. Also, the slope efficiency, that is, the incremental efficiency above threshold, was found to be 2.4%. This was considered quite good for small laser rods.

EXAMPLE 6

Laser rods 0.25 inches in diameter by 3.25 inches in length were prepared for glasses P817, P827, P836 and P847. The rods were ion-exchanged in a molten salt bath containing approximately 22% by weight NaNO₃ plus 78% by weight KNO₃ at 610 degrees F. for 144 hours. The rods were tested for lasing efficiency and for thermal distortion as described in the previous examples. The results of these tests are summarized in the following table:

| Example No. | Glass No. | Lasing Slope Eff. | Relative Thermal Distortion |
|---|---|---|---|
| 1 | 803 | 2.4% | Moderate |
| 14 | 817 | 2.6% | Moderate |
| 15 | 827 | 2.2% | Moderate |
| 16 | 836 | 1.8% | Moderate |
| 18 | 847 | — | Moderate |

All the samples gave a relativley good slope energy efficiency and showed only a moderate amount of beam divergence. In the case of sample P8O3, this relatively low beam divergence is due to the low value of dn/dT expected for these glasses. The low values of dn/dT are in part due to the high amounts of BaO present in the glasses. Even lower thermal distortion glasses may be obtained by further substituting heavier alkali oxides for Li₂O in the glass. However, as will be understood from the explanation of the present invention, this can only be done to a limited extent because of the undesirable effects on the ability to ion-exchange the glasses.

EXAMPLE 7

Samples of glasses P781, P786, P787, P788, P790, P791, P793, P794, P795 and P796 were treated in a molten salt bath consisting of 78% by weight KNO₃ plus 22% by weight NaNO₃ at 610 degrees F. for times ranging from 24 to 48 hours, as shown in the following table. After treatment, the samples were examined and were found to have developed significant stress layers at the surface. The thicknesses of the stress layers were estimated and were given in the following table.

| Example No. | Glass No. | Thickness of Stress Layer Micrometers After Holding | | |
|---|---|---|---|---|
| | | 24 hrs | 46 hrs | 48 hrs |
| 2 | P781 | 150 | 210 | 200 |
| 3 | P786 | 95 | 160 | 150 |
| 4 | P787 | — | 190 | 190 |
| 5 | P788 | — | — | 150 |
| 6 | P789 | — | — | 210 |
| 7 | P790 | — | — | 210 |
| 8 | P791 | — | — | 210 |
| 9 | P793 | — | — | 220 |
| 10 | P794 | — | — | 190 |
| 11 | P795 | — | — | 190 |
| 12 | P796 | — | — | 190 |

The intensity of the stress in all samples was quite high. Also, the stress layers were quite thick in all samples. Therefore, significant strengthening would be expected.

EXAMPLE 8

Samples of glasses P817, P827, and P836 were treated in a molten salt bath containing approximately 78% by weight KNO₃ plus 22% by weight NaNO₃ at 600 degrees F. After treatment, all three samples showed significant stress layers as shown in the following table:

| Example No. | Glass No. | Thickness of Stress Layer After Treatment | % Li₂O | % K₂O |
|---|---|---|---|---|
| 14 | P817 | 120 micrometers | 16 | 1 |
| 15 | P827 | 90 micrometers | 15 | 2 |
| 16 | P836 | 150 micrometers | 17 | 0.5 |

The results show the detrimental effect on ion exchange when substituting K₂O for Li₂O in the glass.

EXAMPLE 9

A filter glass element was formed from glass P842 which was treated in a molten salt bath consisting of 30% by weight NaNO₃ at 605 degrees F. for 48 hours. After treatment, the glass showed a significant stress layer approximately 85 micrometers thick. The glass showed no detectable corrosion of the surface by the salt bath.

EXAMPLE 10

A sample of glass P842 was used to form a filter glass element which was treated in a molten salt bath containing 22% by weight NaNO₃ plus 78% by weight KNO₃ at 610 degrees F. for 18 hours. A significant stress layer was produced.

EXAMPLE 11

A filter glass element was formed from glass P842 which was treated in a molten salt bath containing 15% by weight NaNO₃ plus 85% by weight KNO₃ plus 5% Ca(NO₃)₂ at 590 degrees F. for six days. A significant stress layer approximately 150 micrometers was produced.

EXAMPLE 12

The ion exchange in terms of stress for each sample was ranked as set forth in the following table:

| 1 | 2 | 3 | 4 | 5 | 6 | 7 | 8 | 9 | 10 | 11 |
|---|---|---|---|---|---|---|---|---|---|---|
| good | good | good | good | good | good | good | good | good | good | good |
| 12 | 13 | 14 | 15 | 16 | 17 | 18 | 19 | | 20 | 21 |
| good | good | good | good | good | good | — | very low | | very low | good |

What is claimed is:

1. A method for making a thermal shock-resistant phosphate glass article comprising the steps of:
   forming an optical phosphate glass article consisting essentially of approximately 50 to 70 mole percent $P_2O_5$, approximately 5 to 30 mole percent $Li_2O$, approximately 5 to 25 mole percent MO, wherein M is selected from the group consisting of Be, Mg, Ca, Sr, Ba and Zn and combinations thereof; and approximately 5 to 25 mole percent $X_2O_3$ where X is selected from the group consisting of Al, Y, La, Ce, Pr, Nd, Pm, Sm, Eu, Gd, Tb, Dy, Ho, Er, Tm, Yb and Lu and combinations thereof;
   at a temperature below the annealing temperature of said optical phosphate glass article, contacting the surface of said optical phosphate glass article with a salt bath, said salt bath containing ionic radii larger than the ionic radius of an ion of lithium;
   diffusing said selected ions into the surface of said optical phosphate glass article such that said selected ions replace lithium ions in said phosphate glass article to create a compressive surface layer of said phosphate glass article such that said phosphate glass article has increased thermal shock resistance.

2. The method of making a thermal shock-resistant phosphate glass article recited in claim 1 wherein said combining step further includes combining with said $P_2O_5$, $Li_2O$, MO, and $X_2O_3$, up to about 10 mole percent $R_2O$, where R is selected from the group consisting of Na, K, Rb and Cs and combinations thereof.

3. The method of making a thermal shock-resistant phosphate glass article recited in claim 1 wherein said salt bath is a molten salt bath.

4. The method of making a thermal shock-resistant phosphate glass article recited in claim 2 wherein said salt bath is a molten salt bath.

5. The method of making a thermal shock-resistant phosphate glass article recited in claim 1 wherein said salt bath is a molten alkali metal salt bath.

6. The method of making a thermal shock-resistant phosphate glass article recited in claim 2 wherein said salt bath is a molten alkali metal salt bath.

7. The method of making a thermal shock-resistant phosphate glass article recited in claim 1 wherein said salt bath is a molten alkali metal salt bath selected from the group consisting of sodium, potassium, rubidium and cesium salt baths and combinations thereof.

8. The method of making a thermal shock-resistant phosphate glass article recited in claim 2 wherein said salt bath is a molten alkali metal salt bath selected from the group consisting of sodium, potassium, rubidium and cesium salt baths and combinations thereof.

9. The method of making a thermal shock-resistant phosphate glass article recited in claim 1 wherein said salt bath is maintained at a temperature of between about 280 and 410 degrees C. during said contacting step.

10. The method of making a thermal shock-resistant phosphate glass article recited in claim 2 wherein said salt bath is maintained at a temperature of between about 280 and 410 degrees C. during said contacting step.

11. The method of making a thermal shock-resistant phosphate glass article recited in claim 1 wherein said contacting is carried out for a period of from about 1 to about 500 hours.

12. The method of making a thermal shock-resistant phosphate glass article recited in claim 2 wherein said contacting is carried out for a period of from about 1 to about 500 hours.

13. A method for making a thermal shock-resistant phosphate glass article comprising the steps of:
   forming a phosphate glass article consisting essentially of, in mole percent, approximately 50 to 70% $P_2O_5$, approximately 15 to 30% $Li_2O$, up to approximately 10% $R_2O$, where R is selected from the group consisting of Na, K, Rb and Cs and combinations thereof, approximately 5 to 25% MO, where M is selected from the group consisting of Be, Mg, Ca, Sr, Ba and Zn and combinations thereof, and approximately 5 to 25% $X_2O_3$, where X is selected from the group consisting of Al, Y, La, Ce, Pr, Nd, Pm, Sm, Eu, Gd, Tb, Dy, Ho, Er, Tm, Yb and Lu and combinations thereof;
   at a temperature below the annealing temperature of said phosphate glass article, contacting the surface of said phosphate glass article with a salt bath, said salt bath containing ions having ionic radii larger than the ionic radius of an ion of lithium;
   diffusing said selected ions into the surface of said phosphate glass article such that said selected ions replace lithium ions in said phosphate glass article to create a compressive layer of said phosphate glass article such that said phosphate article has increased thermal shock resistance.

* * * * *